US005177503A

United States Patent [19]

Kubelik

[11] Patent Number: 5,177,503

[45] Date of Patent: Jan. 5, 1993

[54] PRINT SYSTEM AND DIELECTRIC IMAGING MEMBER

[75] Inventor: Igor Kubelik, Mississauga, Canada

[73] Assignee: Delphax Systems, Canton, Mass.

[21] Appl. No.: 705,303

[22] Filed: May 24, 1991

[51] Int. Cl.[5] .............................................. G01D 9/00

[52] U.S. Cl. ................................ 346/135.1; 428/212; 428/411.1

[58] Field of Search ............................ 346/135.1, 1.1; 428/212, 411.1, 195

[56] References Cited

U.S. PATENT DOCUMENTS 3,712,728 1/1973 Whittaker ........................ 346/153.1

3,784,398 1/1974 Metcalfe et al. ................... 117/17.5

OTHER PUBLICATIONS

"Limiting Factors of High Resolution and Gray Scale Ionographic Printing" Igor Kubelik, Hard Copy and Printing Technologies, Feb. 13-14, 1990 Conference in Santa Clara, Calif., vol. 1252.

*Primary Examiner*—Benjamin R. Fuller

*Assistant Examiner*—Randy W. Gibson

*Attorney, Agent, or Firm*—Lahive & Cockfield

[57] ABSTRACT

A dielectric imaging member of a printer receives a latent charge image that is preferably projected as a plurality of charge dots from a multi-electrode printhead. The member has charging characteristics that diminish the normal electric field component at the edge of charge dots deposited on its surface. The dielectric constant of a surface layer of the imaging member decreases with depth, either continuously, or in a stepwise manner. Various printing aberrations, such as voids in grey-scale images, fringing rings about dots, dot spreading and filling between dots are corrected, so that compensating image coding of printhead actuation sequences is not required to deposit a faithful electrostatic latent image.

13 Claims, 4 Drawing Sheets

PRINT SYSTEM AND DIELECTRIC IMAGING MEMBER

BACKGROUND OF THE INVENTION

The present invention relates to electrographic imaging of the type wherein a printed image is created by a process which involves formation of an intermediate or latent charge image, development of the intermediate image, for example, by the application of a toner powder, and transfer of the developed image to a recording sheet. In particular, it relates to such imaging wherein the latent charge image is formed by the projection of charge carriers, i.e., ions, electrons or both, onto a latent imaging member, or wherein the latent charge image is otherwise formed at the surface such that closely contiguous points on the imaging member receive distinctly different levels of charge.

A problem exists in imaging systems of this type that the charged particles are projected onto a smooth and substantially uniform dielectric surface, and the latent image so deposited is subject to a certain amount of charge spreading and other electrical field effects that distort the intended charge distribution. Consequently, if an image is laid down without regard to these effects, it will result in a distorted print. Such distortions may include changing of line widths, disappearance of grey scale image portions, or distortion of the boundary regions separating image details of differing charge value.

Accordingly, it has become important to understand the sources of these distortions and to develop methods to avoid or correct them. This is especially true as such systems are applied to form print images with resolution above 200 dpi, or to form images with multiple tone levels or colors.

SUMMARY OF THE INVENTION

In accordance with a principal aspect of the invention, latent image distortion is reduced by providing a latent imaging member with improved surface electric field characteristics. A graded or multilayer dielectric construction alters the charging characteristics at the member surface to reduce the fringing field around a charge dot and its perpendicular electric field component. This prevents extraneous toner pick-up outside the dot boundary as well as certain undesired interaction effects between adjacent dots.

In one embodiment, the latent imaging member has an outer surface formed of a dielectric material having a dielectric constant $\epsilon_1$, and has a subsurface layer of dielectric constant $\epsilon_2 < \epsilon_1$. In another embodiment the latent imaging member has a dielectric coating which is graded to have decreasing dielectric constant with increasing depth from the surface. The surface is formed by a chemical vapor deposition (CVD) process, by a process of co-sputtering two materials, by spraying, or by other deposition process wherein the deposition parameters are changed over time to provide an increasing dielectric constant of the deposited material during deposition.

The latent imaging member is particularly suited to printer systems which apply a resistive or inductive toner to develop the latent image. In one presently preferred embodiment of a printer system incorporating the latent imaging member, the member is charged by the projection of charge carriers from a matrix electrode array or "printhead" in which pixels of the latent image correspond to electrode crossings of the matrix electrode array. Improved field characteristics of the imaging member result in a more faithful spatial correspondence between the size and shape of charge dots deposited in this manner, and the geometry of the array. This reduction in the distortion caused by localized fields on the imaging member simplifies the faithful conversion of computerized images, such as type faces or graphics, to rasterized electrode actuation sequences for driving the printhead.

BRIEF DESCRIPTION OF THE DRAWINGS

These and other features of the invention will be understood from the description herein, taken together with the explanatory illustrations and drawings of particular embodiments, wherein.

DETAILED DESCRIPTION OF THE INVENTION

Figure 1:
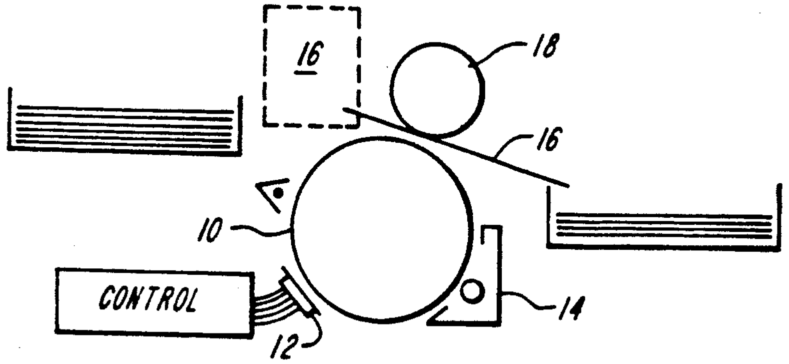
FIG. 1 shows the structure of a printer system suitable for the practice of the invention.

FIG. 1 illustrates an electrographic printer and its major components, by way of general technical background, the view being equally applicable to systems embodying the present invention as well as numerous prior art printers.

As shown, a dielectric imaging member 10 is positioned opposite a charge-projecting printhead 12 that projects "dots" of charged particles from an ordered matrix of electrode locations of printhead 12 onto the member 10 as it rotates or travels past the printhead.

The deposited charge dots form an electrostatic latent image on the surface, and this image is "toned" or developed by a pigmented toner as the surface rotates or is carried past a developing station 14. The developed image is then transferred to a recording sheet 16 at a nip formed between transfer roller 18 and member 10, after which the sheet preferably passes through a fuser 16 to fix the transferred image permanently on the sheet. Variations of this basic structure are possible, including constructions utilizing one or more intermediate transfer belts for receiving and transferring the latent image, the developed image, or both, or constructions involving the replacement of the drum imaging member 10 with a belt or a reciprocating dielectric sheet. The printhead is preferably a so-called "ionographic" printhead, which may project flowing streams of ionized gas, or streams of positive or negative ions, or streams of electrons, to form the latent charge image on member 10. Each stream or packet of charge carriers deposits a latent image dot, which, when developed, has a diameter typically between about 0.05 and 0.25 mm.

Applicant is here particularly concerned with printing systems of the aforesaid type utilizing a resistive or inductive toner, wherein the pick up of toner during development of the latent image depends strongly on the electric field in the gap between the imaging member and a developing roll. Specifically, with an inductive toner, any charge above a positive or negative threshhold on the drum will induce a charge on the toner particles and draw them to the latent image. With a resistive toner, the toner is triboelectrically charged to one polarity and is drawn only to latent image regions that are charged with the opposite polarity.

Figure 2A:
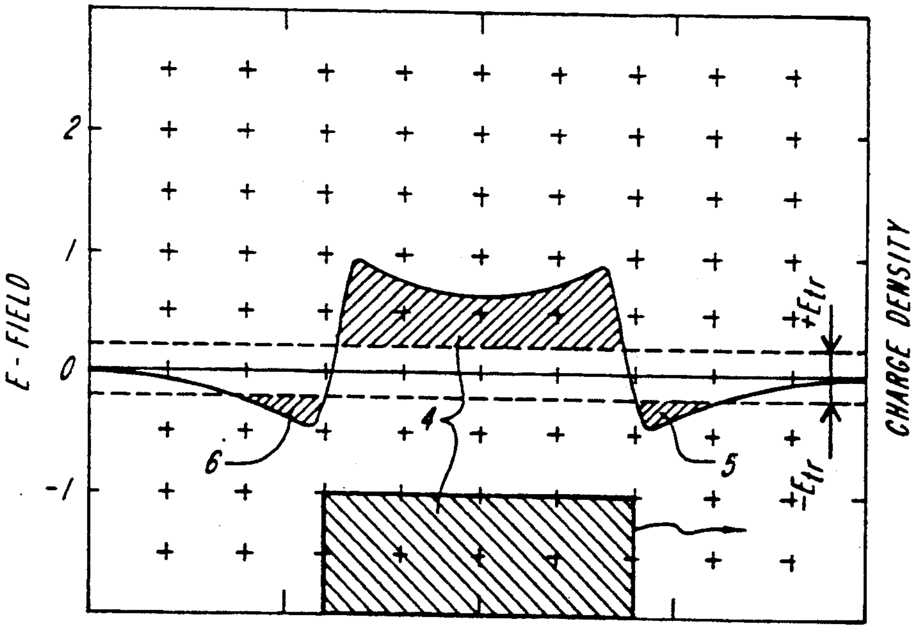
FIGS. 2A–2C illustrate charge deposition and image development characteristics of a prior art latent imaging member.
Figure 2B:
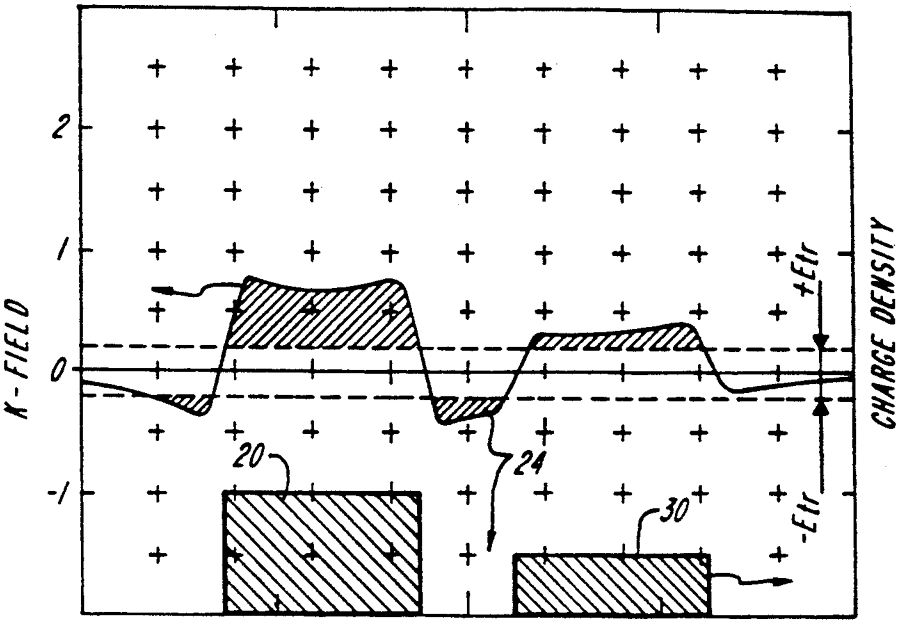
Figure 2C:
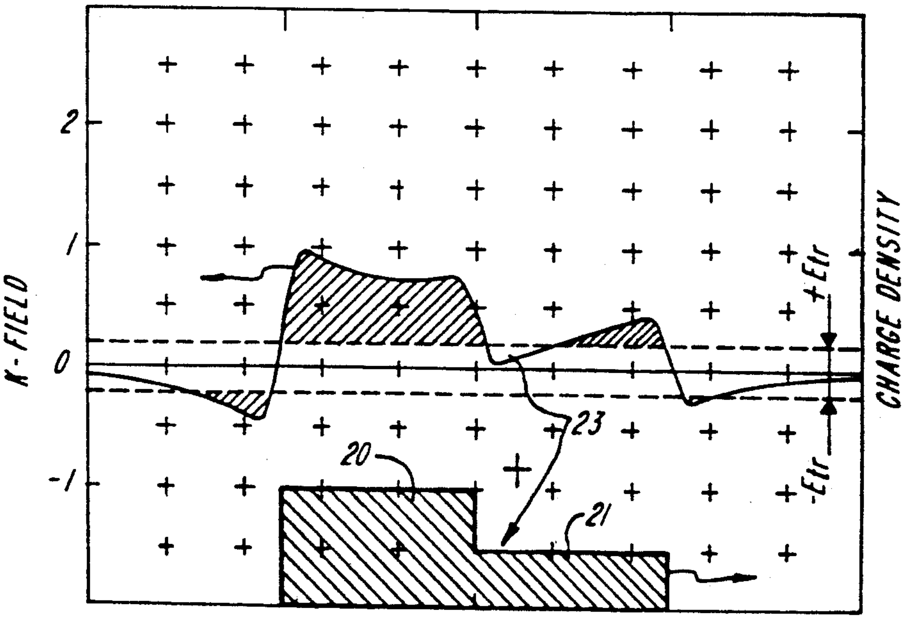

FIGS. 2A-2C illustrate certain irregularities which occur during development of the latent image in a prior art print system. In FIG. 2A, the shape of a nominal latent image charge dot 4 is indicated in section along the lower edge of the graph, corresponding to the charge density in the dot region at which charge was directed. Plotted above the dot 4 is a graph of the vertical component of the electric field in the air gap near the surface above this dot. As shown, there is a slight dip in field strength at the center of the dot, and a relatively strong fringing field of opposite polarity in an annular region immediately surrounding the dot. Dashed lines $E_{T+}$ and $E_{T-}$ indicate the positive and negative electric field threshold intensity between which no toner is picked up by the latent image. Using an inductive toner any field of greater magnitude, positive or negative, attracts toner. The shading in regions 5 and 6 indicates these regions of toner attachment, the regions 5, 6 being manifested as spreading of the dot 4 beyond its intended size.

FIG. 2B shows a similar graph of the toner-attractive field component for the case of two dots 20 and 30 of larger and smaller charge density, respectively, that are deposited close to each other. In this case, the fringing fields may overlap in the area between the two dots so that toner is attracted to fill the entire area 24 between them. The result is a substantially continuous toned area in the developed image.

In FIG. 2C a third development anomaly is illustrated, that arises when a low charge density dot 21 is deposited contiguous to a high charge density dot 20. In this case, the negative-valued fringing field of the high density dot entirely cancels the principal field of the low density dot at the edges of dot 20, resulting in a region 23 within the body of dot 21 at which the toner-attracting E field does not rise above the toning threshold $E_T$. This creates a void inside of the toned dot 21, distorting the intended image.

Figure 3:
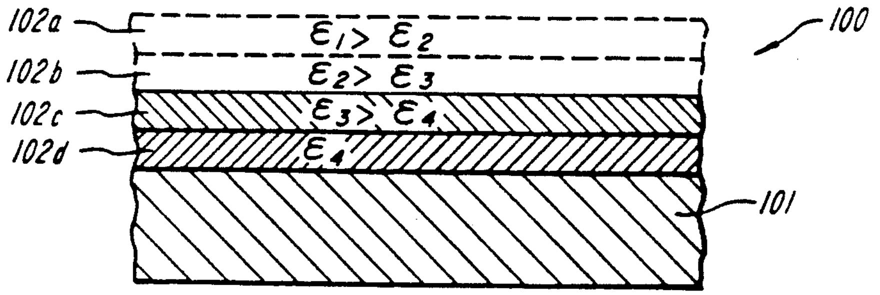
FIGS. 3 and 4 illustrate two different embodiments of an improved imaging member according to the present invention.

FIG. 3 shows in sectional view the structure of an improved dielectric imaging member 100 in accordance with the present invention, for addressing these imaging problems. Member 100 has a sublayer 101 which provides structural support and an electrical bias backplane for the member, and has surface layers 102*a*, 102*b* ... having dielectric properties described more fully below. Sublayer 101 may, for example, be a metal drum which serves as the core of the imaging member 10 of FIG. 1. In a belt-type imaging system, sublayer 101 may comprise, for example, a polyimide or other strong belt member having a conductive, e.g., metallized, layer, or may consist of a flexible metal foil which fulfills both the structural and electrical requirements.

Surface layers 102*a*, 102*b* ... in accordance with a principal aspect of the present invention, have a dielectric constant $\epsilon$ which increases closer to the surface. Two such layers are shown, with possible additional layers indicated in phantom, which may be employed in different embodiments of the invention. In each case, as the successive layers approach the surface, they are made of material with successively greater dielectric constant. This construction assures that when a charge distribution is deposited as a discrete dot on the surface, it does not have a pronounced (i.e., above the toning threshold) vertical electric field component in the fringing area surrounding the dot. The equipotentials in the air gap above the imaging surface bend down to approach the surface almost perpendicularly at the dot edges.

Rather than construction in discrete layers 102*a*, 102*b* ..., the surface in accordance with another aspect of the invention may also be formed with a continuously increasing dielectric constant. This may be achieved, for example, by forming the surface using a sputtering, CVD, spraying or other process that simultaneously lays down two materials each having different permitivities. The relative proportions of the two materials are changed during deposition to cause an increasingly greater proportion of the material with higher permitivity to be deposited as the ultimate surface is approached. Any other process which causes the lowering of the dielectric constant with increasing depth may also be used.

Figure 4:
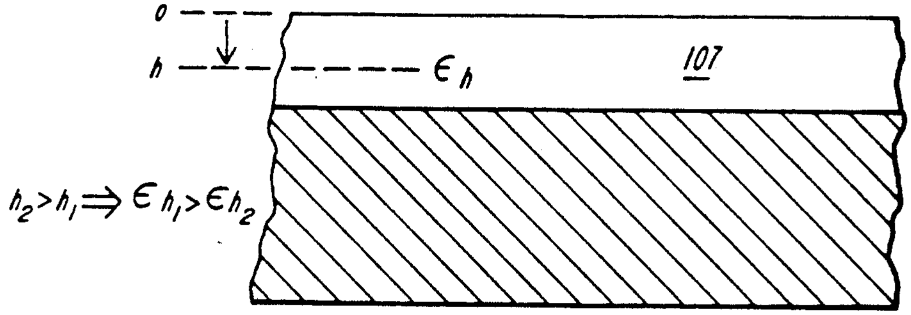

Such a graded dielectric layer is indicated in FIG. 4. In this embodiment a dielectric imaging layer 107 is deposited such that the dielectric constant at a depth $h_1$ is greater than at depth $h_2$ if $h_2>h_1$.

Figure 5A:
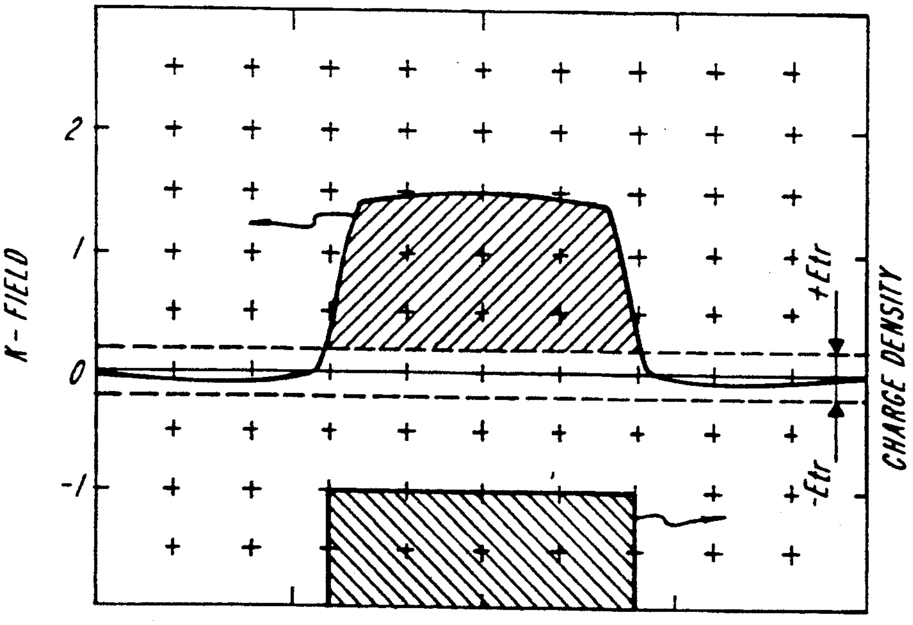
FIGS. 5A–5C illustrate charge deposition and image development characteristics of a printing system having an imaging member in accordance with the present invention.
Figure 5B:
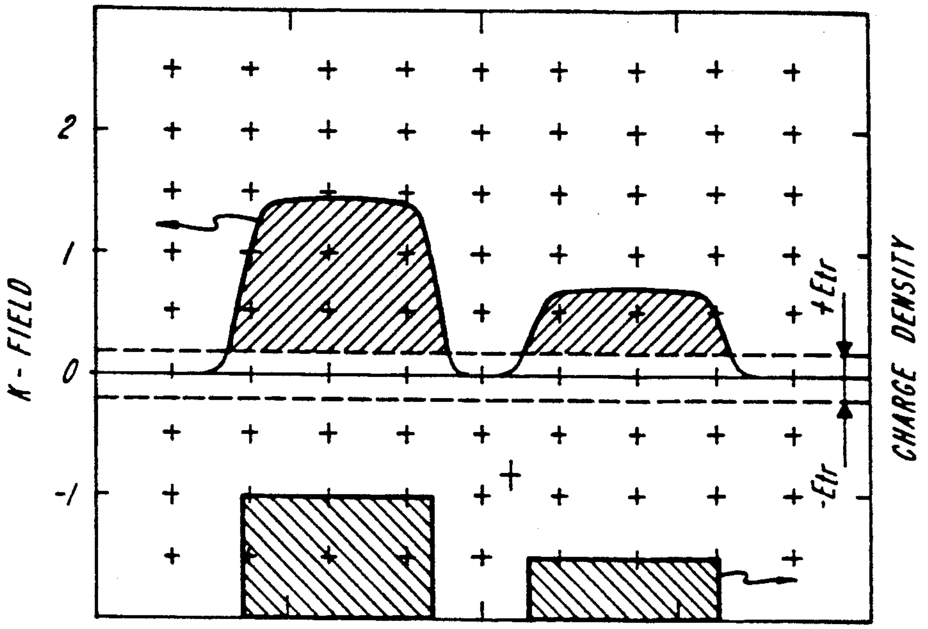
Figure 5C:
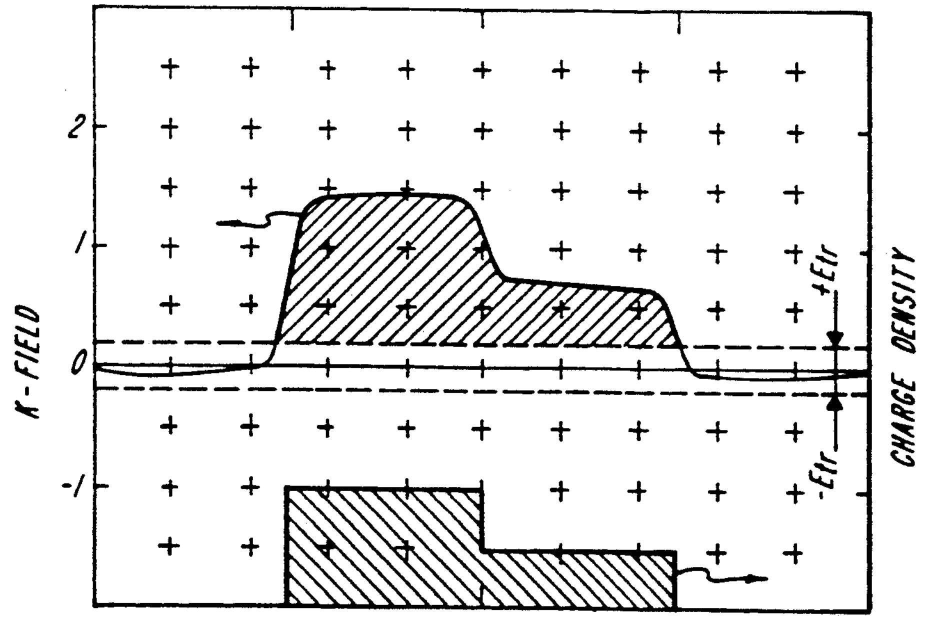

FIGS. 5A-5C show the development characteristics of a latent image formed on the dielectric imaging members of FIGS. 3 or 4. The Figures use the same graphic representation as FIGS. 2A-2C, with the intended charge, fringing field intensity, and toned image density each indicated as a function of position in the neighborhood of a charge dot on the imaging member. Notably, the fringing field of a single charge dot shown in FIG. 5A no longer attains the toning threshold in a peripheral ring area, so dot spreading and "haloes" are diminished or avoided. Further, as illustrated in FIGS. 5B and 5C, the fringing fields of two contiguous or closely adjacent dots no longer interfere to form visual artifacts of increased or decreased density between the two dots.

Instead, with the imaging member of the present invention, each toned dot has dimensions and graphic density corresponding fairly exactly to the deposited charge dot size and density.

By way of historical background, it should be noted that products embodying "ionographic" printers have been commercially constructed with polished aluminum imaging drums which were oxidized to form a hard dielectric surface having a dielectric constant of about 8. These drums were generally "sealed", i.e., coated, baked and polished, with a hydrocarbon coating, such as carnauba wax, of a lesser dielectric constant of about 3. These prior art printers thus enjoyed an imaging surface wherein the dielectric constant decreased toward the surface. The present invention reverses the electrical characteristics of that prior art construction.

For forming graded or stepped capacitance imaging members in accordance with the present invention, one suitable method of fabrication is to apply polymer films in a liquid state having solid dielectric filler material in the film composition. $SiO_2$ and $TaO_2$, aluminum oxide or tantulum oxide are all suitable fillers. In general, for a very thin surface layer, that is, one having a thickness below about 25 micrometers and preferably below about 2 micrometers, it is desirable that the surface layer permitivity $\epsilon$ be a high multiple, e.g. 10 to 100 times that of the underlying layer.

This completes a description of the invention, which has been illustrated in broad lines by reference to illustrative embodiments thereof. Armed with this disclosure, variations and modifications adapting the invention to the imaging portions of diverse printing machines will occur to those skilled in the art, and all such variations and modifications are considered to be within the spirit and scope of the present invention, as defined in the claims appended hereto.

I claim:

1. A dielectric imaging member for receiving a latent charge image for development to form a recording, such dielectric imaging member being movable to receive the latent charge image on a surface thereof and wherein the surface comprises an outer surface region and a subsurface region having dielectric constants $\epsilon_0$ and $\epsilon_1$, respectively, such that $\epsilon_0$ is greater than $\epsilon_1$.

2. A dielectric imaging member according to claim 1, having plural discrete layers extending outwardly from the subsurface regions to the surface region, and wherein an outer layer has a dielectric constant greater than an inwardly adjacent layer.

3. A dielectric imaging member according to claim 1, wherein the subsurface region has a graded dielectric constant increasing toward the outer surface region.

4. A dielectric imaging member according to claim 1, formed as a drum.

5. A dielectric imaging member according to claim 1, formed as a belt.

6. A dielectric imaging member according to claim 1, having an effective capacitance at said outer surface region of between approximately five and five hundred pf/cm$^2$.

7. An electrographic printer comprising printhead means for projecting charge carriers to form an imagewise charge pattern a latent dielectric imaging member for receiving the imagewise charge pattern as a latent charge image, said latent imaging member having an image-receiving surface construction characterized by a dielectric constant that decreases with increasing depth means for developing the latent charge image to form a developed image, and means for fixing the developed image as a print.

8. A printer according to claim 7, wherein the latent imaging member has surface coating of graded dielectric constants constant.

9. A printer according to claim 7, wherein the latent imaging member has a plurality of surface layers of differing dielectric constants.

10. A printer according to claim 7, wherein the latent imaging member has a dielectric constant stepwise decreasing with increasing depth.

11. A method of controlling charge spreading of a latent charge image deposited on an dielectric imaging surface, such method comprising the steps of providing as said imaging surface a chargeable surface having a dielectric constant decreasing with depth, and depositing the latent charge image on said chargeable surface.

12. A method of accurately controlling a level of charge in a latent charge image deposited on a chargeable dielectric surface, such method comprising the step of providing a chargeable surface having a dielectric constant, that decreases with depth thereby reducing a fringing field around regions of deposited charge, wherein equipotentials in an air gap above the surface approach normal incidence at an edge of a deposited charge dot.

13. The method of claim 12, wherein the step of providing a chargeable surface includes providing a surface with an outer layer of thickness between one and about twenty-five micrometers and having a dielectric constant at least several times greater than that of a layer of material directly underlying said outer layer.

* * * * *